Jan. 13, 1948. E. O. COURTEMANCHE 2,434,351
WELDING DEVICE
Filed Dec. 17, 1945 3 Sheets-Sheet 1
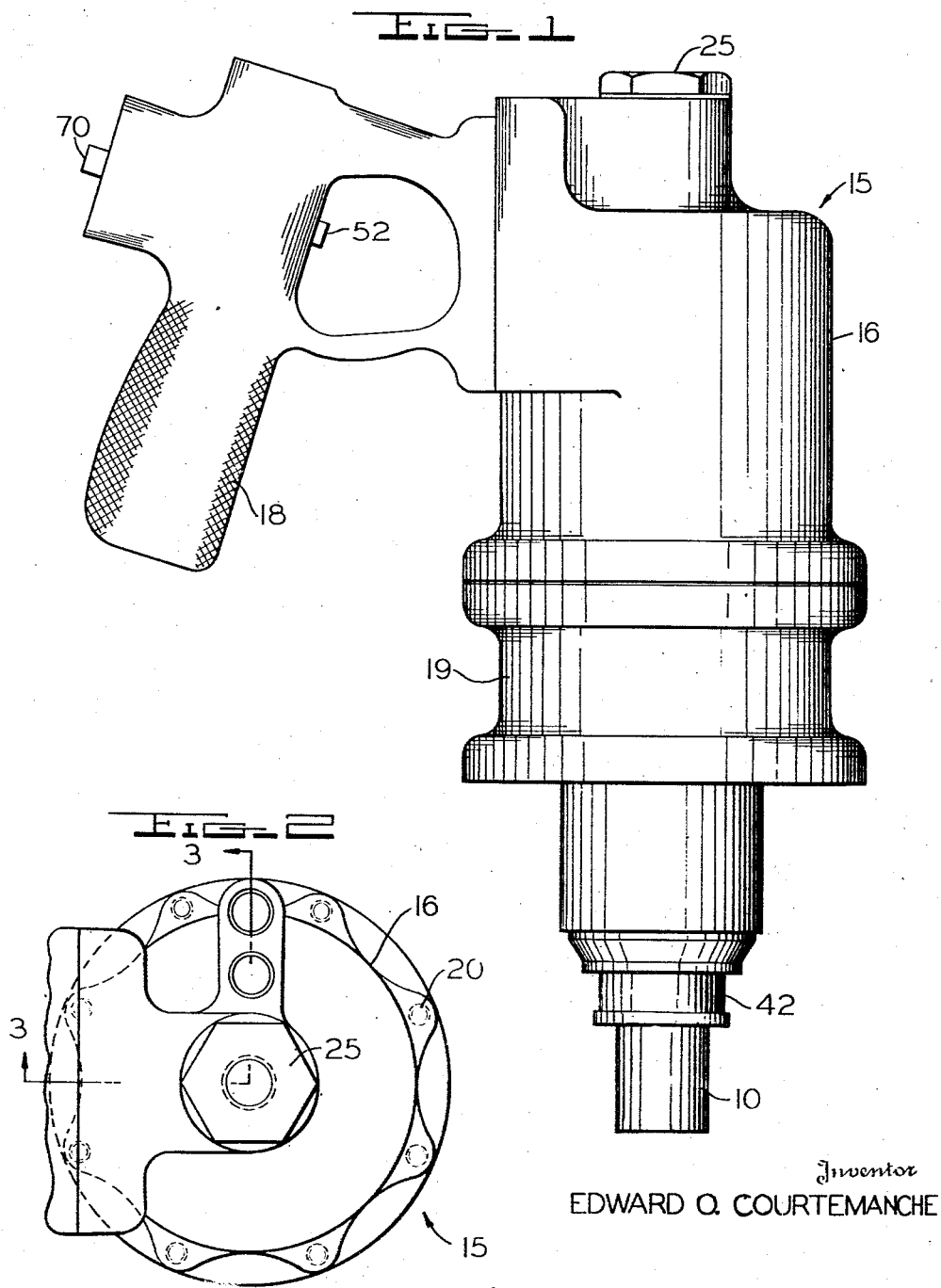
Inventor
EDWARD O. COURTEMANCHE
By Whittemore Hulbert & Belknap
Attorney

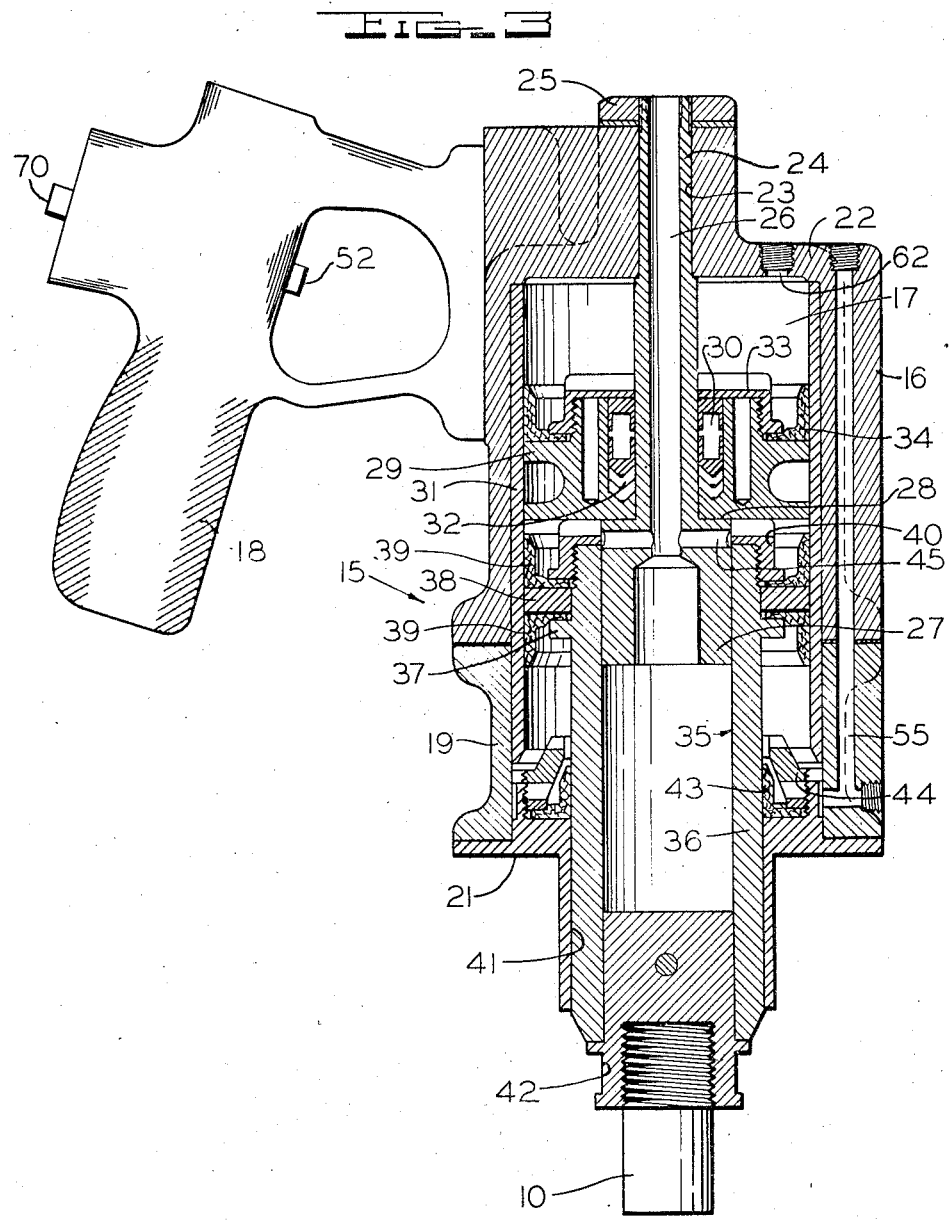

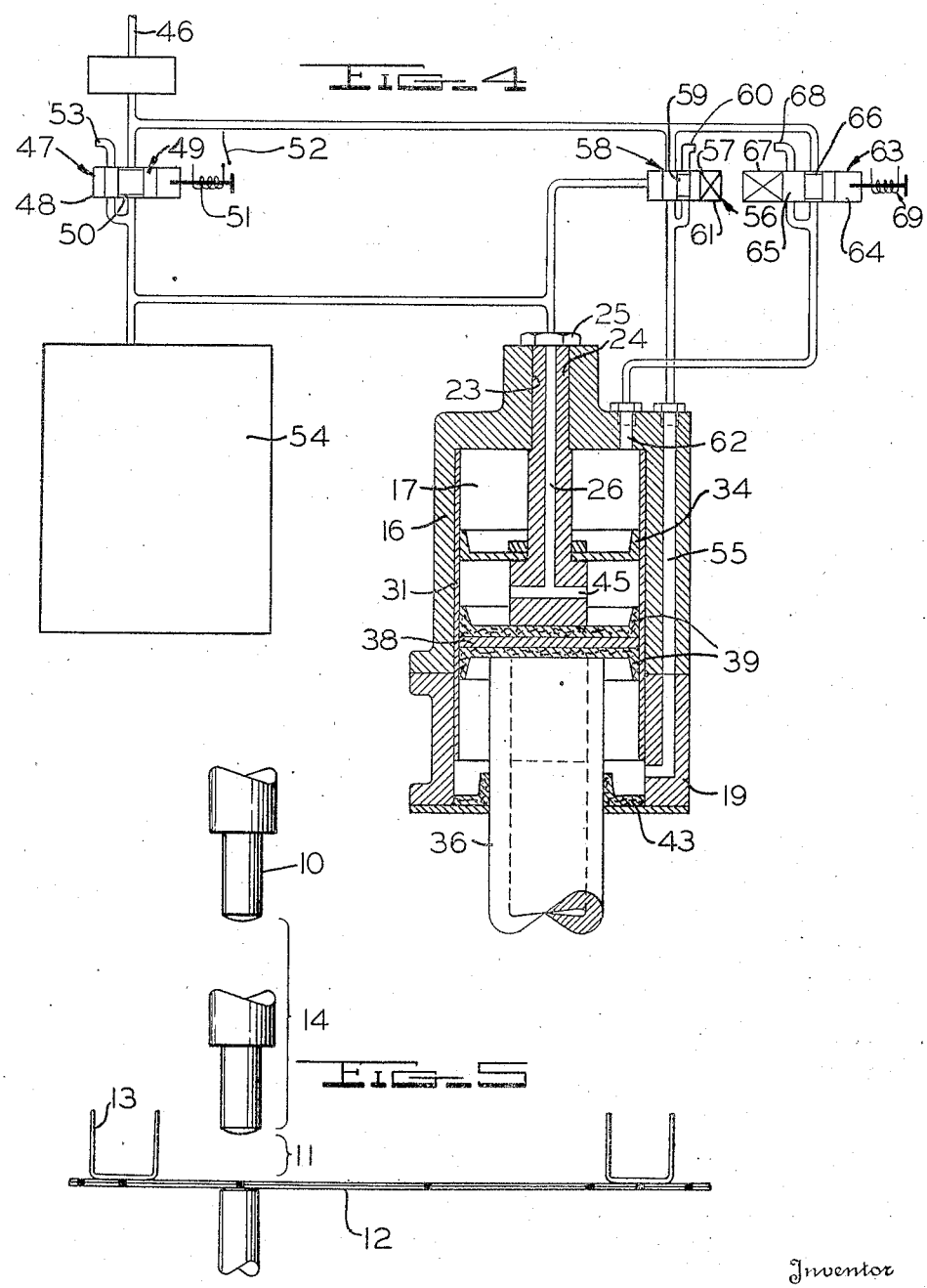

Patented Jan. 13, 1948

2,434,351

UNITED STATES PATENT OFFICE 2,434,351

WELDING DEVICE

Edward O. Courtemanche, Roseville, Mich., assignor to Briggs Manufacturing Company, Detroit, Mich., a corporation of Michigan Application December 17, 1945, Serial No. 635,489

5 Claims. (Cl. 219—4)

This invention relates generally to welding apparatus and refers more particularly to improvements in spot welding equipment.

Spot welders used in fabricating parts on a production basis are usually designed with a relatively short welding stroke, so that the time lost during relative movement of the electrodes into and out of engagement with the work is reduced to a minimum. However, the nature of the work, in some instances, necessitates separating the electrodes beyond the range of the required welding stroke in order to provide adequate clearance for ribbing, braces or other parts which may project from the work.

It follows from the foregoing that in welding work having parts projecting therefrom, it is necessary to periodically increase the extent of separation of the electrodes to clear the parts and it is an object of this invention to provide a welder having means selectively operable to separate the electrodes beyond the normal welding stroke range.

Another object of this invention is to provide a welder of the above general type having provision for varying the extent of separation of the electrodes beyond the normal welding stroke without altering the latter.

The foregoing as well as other objects will be made more apparent as this description proceeds, especially when considered in connection with the accompanying drawings, wherein:

Figure 1 is a side elevational view of a welding device embodying the features of this invention;

Figure 2 is an end elevation of the device shown in Figure 1;

Figure 3 is a sectional view taken substantially on the plane indicated by the line 3—3 of Figure 2;

Figure 4 is a diagram illustrating one type of control circuit that may be employed for operating the welder; and Figure 5 is a diagrammatic view showing the application of the welder to a typical workpiece.

The welder selected for the purpose of illustrating the present invention is a portable spot welder having a reciprocal electrode normally movable throughout a range of travel which is restricted in order to reduce the time interval between successive welds to a minimum and in order to facilitate placing the welds at preselected locations. The movable electrode is designated in several of the figures of the drawings by the reference character 10 and the normal restricted travel of the electrode is designated in Figure 5 of the drawings by the reference character 11.

Although it is highly advantageous to maintain the length of the welding stroke of the movable electrode 10 to a minimum, nevertheless, in some instances, it may be desirable to increase the length of the electrode stroke. For example, when welding work of the type indicated by the numeral 12 in Figure 5, it is desirable to retract the movable electrode 10 sufficiently to enable passing the electrode over the ribs 13 on the work 12. As shown in Figure 5, the height of the ribs 13 is greater than the length of the normal welding stroke of the electrode 10 and the present invention provides for selectively increasing the stroke of the movable electrode sufficiently to enable the welder to be passed over the rib 13. The additional retracting stroke of the movable electrode 10 is indicated in Figure 5 by the reference character 14 and the present invention also provides for varying the stroke to suit different types of work.

With the above in view, reference is now made more in detail to the drawings, wherein the reference character 15 indicates a portable spot welder comprising a casing 16 having a cylinder 17 and having a pistol-type grip 18 secured to the upper end thereof. An adaptor in the form of a ring 19 is detachably secured to the lower end of the casing 16 by studs 20 and forms an extension of the cylinder 17. The studs 20 extend through the ring 19 and also serve to detachably secure a cap 21 to the lower end of the ring.

The top of the cylinder 17 is closed by the upper wall 22 of the casing and this wall is formed with a central bore 23 for receiving a rod 24 having the upper end secured to the casing by a nut 25. The rod 24 projects downwardly into the cylinder 17 in concentric relation to the latter and is formed with an axially extending passage 26. The lower end of the rod 24 has an enlargement 27 which forms an annular shoulder or stop 28 intermediate the ends of the cylinder 17.

A retracting piston 29 is slidably mounted in the cylinder 17 between the annular stop 28 and the top wall 22 of the cylinder. The piston 29 has a central opening 30 therethrough for freely receiving the rod 24 and the periphery of the piston slidably engages a sleeve 31 formed of a material having good wearing qualities such, for example, as steel. The sleeve 31 is of sufficient length to form a liner for the cylinder 17 and enables forming the casing 16 and the adaptor 19 of a relatively light weight material, such for example, as aluminum or aluminum alloy. The escape of fluid medium from one end of the piston 29 to the other through the central opening 30 is prevented by a suitable packing 32 held in place by a nut 33 threadedly mounted on the upper end of the piston. The escape of fluid medium past the peripheral portion of the piston 29 is prevented by means of a flexible cup-shaped seal 34, which is secured to the top of the piston by the nut 33.

A second piston assembly 35 is slidably supported in the cylinder 17 between the retracting piston 29 and the cap 21. The piston assembly 35 comprises an elongated sleeve 36 having the upper end slidably supported on the enlarged portion 27 of the rod 24 and having an annular flange 37 projecting radially outwardly therefrom adjacent the upper end thereof. A ring 38 is positioned on the sleeve 36 above the annular flange 37 and a pair of oppositely extending cup-shaped seals 39 are seated against opposite sides of the ring. The two seals and the ring 38 are clamped against the annular flange 37 by means of a nut 40, which is threaded on the upper end of the sleeve 36. The periphery of the ring and the two seals 39 frictionally engage the cylinder liner 31 to prevent the escape of fluid past the periphery of the piston 35. The bottom portion of the sleeve 36 projects downwardly through a central opening 41 in the cap 21 and the electrode 10 is secured to the sleeve by a fixture 42. The escape of fluid medium from the cylinder along the periphery of the sleeve 36 is prevented by a flexible cup-shaped seal 43 secured to the cap 21 by means of an annular nut 44.

Upon reference to Figure 4 of the drawings, it will be noted that the axial passage 26 through the rod 24 communciates with the interior of the cylinder 17 between the two pistons by means of radially outwardly extending passages 45. Referring now to Figure 4 of the drawings, it will be noted that the upper end of the passage 26 is connected to a fluid pressure supply line 46 through the medium of a valve 47 having a chamber 48 and a plunger 49 reciprocably mounted in the chamber. The plunger 49 is reduced intermediate the ends to form an annular recess 50, which is adapted to connect the fluid pressure supply line 46 to the passage 26 when the valve plunger is in the position thereof shown in Figure 4 of the drawings. The valve plunger 49 is moved to the above open position by means of a solenoid 51 connected in an electric circuit with a switch 52. The switch 52 is supported on the grip 18 of the welder in a position for convenient manipulation by the operator. Owing to the balanced nature of the valve plunger 49, the latter is maintained in the open position shown in Figure 4 of the drawings by the action of fluid under pressure flowing through the valve casing. The valve plunger 49 is moved to close the fluid pressure supply line 46 and to open an exhaust port 53 in the casing by fluid under pressure supplied by a control unit 54.

Referring again to Figure 3 of the drawings, it will be noted that the casing 16 and the adaptor 19 are formed with aligned bores providing a passage 55. The lower end of the passage 55 communicates with the cylinder 17 adjacent the bottom of the latter and the upper end of the passage 55 communicates with the fluid pressure supply line in advance of the valve 47 through a valve 56. The valve 56 has a casing 57 and a plunger 58 reciprocably mounted in the casing. The plunger is reduced intermediate the ends thereof to form an annular chamber 59 adapted to connect the fluid pressure supply line 46 to the passage 55. One end of the valve casing 57 is connected to the passage 26, so that when fluid under pressure is admitted to the welder cylinder 26, it is also admitted to the valve casing 57 to move the valve plunger 58 to the position shown in Figure 4 of the drawings, wherein communication between the fluid pressure supply line 46 and the passage 55 is closed. In this latter position of the valve plunger 58, the passage 55 is connected to the exhaust port 60 in the valve casing 57 and the portion of the cylinder below the piston 35 is substantially relieved. On the other hand, when the valve 47 is in a position to connect the passage 26 or the portion of the cylinder 17 above the piston 35 with the exhaust port 53, the valve plunger 58 is moved by a spring 61 to a position wherein the annular chamber 59 connects the fluid pressure supply line 46 to the passage 55 and fluid under pressure is admitted to the lower end of the cylinder 35. As a result, the piston 35 is moved upwardly in the cylinder and the electrode 10 is disengaged from the work.

The upper end of the cylinder 17 is provided with an intake port 62 which also communicates with the fluid pressure supply line 46 in advance of the valve 47 through a valve assembly 63. The valve assembly 63 is similar to the valve assembly 47 in that it is provided with a casing 64 and a plunger 65 reciprocably mounted in the casing. The plunger 65 has a reduced portion intermediate the ends forming an annular chamber 66 adapted to connect the pressure supply line 46 to the intake port 62 in the upper end of the cylinder 17. The valve plunger is normally urged to the above position by means of a coil spring 67 and is moved against the action of the coil spring to connect the port 62 to the exhaust port 68 in the valve casing 64 by a solenoid 69. The solenoid 69 is arranged in an electric circuit with a switch 70, which is also supported in the grip 18 for convenient manipulation.

Referring now to the operation of the welder previously described and assuming that the several parts thereof are in the relative positions shown in Figure 3 of the drawings, it will be noted that to initiate a weld, the operator merely closes the switch 52 to energize the solenoid 51. Energization of the solenoid 51 operates the valve plunger 49 to connect the fluid pressure supply line 46 to the passage 26 in the rod 24 of the welder. At the same time fluid under pressure is admitted to the passage 26, it is also conducted to the valve 56 to move the valve plunger 58 to the position shown in Figure 4 of the drawings, wherein the passage 55 is connected to the exhaust port 60. Thus, the portion of the cylinder below the piston 35 is connected to the exhaust so that as fluid under pressure is discharged into the cylinder through the ports 45, a pressure is built up in the cylinder at the top of the piston 35 sufficient to move the piston 35 downwardly and engage the electrode 10 with the work. It will be noted from the above that fluid under pressure is discharged through the ports 45 into the cylinder between the pistons 29 and 35. Under ordinary operating conditions, it is desired to maintain the piston 29 in engagement with the stop 28 during movement of the piston 35 in a direction to engage the electrode with the work. In this connection, attention is again directed to Figure 4 of the drawings, wherein it will be noted that the valve 63 is open and connects the upper end of the cylinder 17 to the source of fluid pressure 46 beyond the valve 47. Thus, line pressure is maintained in the cylinder 17 above the piston 29 and the effective area of the top of the piston 29 is greater than the effective area of the lower end of the piston. As a result, the piston 29 is held against the stop 23 while the piston 35 is operated to engage the electrode with the work.

After the electrode 10 engages the work, the welding circuit (not shown) is closed by the control unit 54 and is maintained closed for a predetermined period of time depending upon the adjustment of the control unit. When the weld is completed, the control unit operates to supply fluid under pressure to the valve 47 and move the plunger to a position wherein the passage 26 is connected to the exhaust 53. The resulting drop in pressure in the cylinder 17 above the piston 35 enables the spring 61 to open the valve 56 and connect the passage 55 to the fluid pressure supply line 46. As a result, fluid under pressure is discharged into the cylinder 17 below the piston 35 and the latter is moved to its uppermost position in engagement with the bottom of the piston 29. The piston 29, however, remains in its lowermost position due to the fact that line pressure still exists in the cylinder 17 above the piston 29. The above cycle of operation may be repeated as often as required without disturbing the position of the piston 29. In cases where the work being welded is of the type shown in Figure 5 of the drawings wherein the height of the rib is substantially greater than the normal stroke 11 of the movable electrode 10, it is necessary to increase the extent of retraction of the electrode in order to clear the rib 13. This is accomplished by closing the switch 70 to energize the solenoid 69 and thereby move the valve plunger 65 against the action of the spring 67 to connect the port 62 to the exhaust 68. As a result, the pressure in the cylinder 17 above the piston 29 drops considerably and the piston 29 may be moved upwardly by the piston 35 as the latter withdraws the electrode from the work. In other words, the actual stroke of the electrode is increased by the extent of upward movement of the piston 29 and is indicated in Figure 5 of the drawings by the reference character 14. The switch 70 is maintained in its closed position until the movable electrode has cleared the adjacent obstruction, whereupon the switch is released to deenergize the solenoid and permit the spring 67 to again open the valve 63.

Another outstanding feature of the welder previously described is that the stroke of the retracting piston 29 may be readily varied by merely interchanging certain parts of the welder. Assuming that it is desired to increase the length of the retracting stroke of the piston 29, the studs 20 are merely removed and the parts 19, 24, 31 and 36 are interchanged with corresponding parts of the required length. This enables obtaining practically any desired extent of retracting movement of the piston 29 without affecting the normal stroke 11 of the electrode.

What I claim as my invention is:

1. A welder comprising a cylinder having a stop intermediate the ends thereof, a piston slidably mounted in the cylinder, an electrode connected to said piston, means for limiting the stroke of the piston including a second piston slidably mounted in the cylinder and engageable with said stop, means for alternatively introducing fluid under pressure into the cylinder at opposite ends of the electrode piston to move the electrode into and out of engagement with the work to be welded, means on the electrode piston engageable with the inner end of the second piston, means for by-passing fluid under pressure to the cylinder at the outer end of the second piston, the area of the outer end of the second piston exposed to the fluid pressure being greater than the area of the inner end of the second piston whereby the latter is held seated on the stop against movement by the fluid pressure acting on the electrode piston, and selectively operable means for relieving the pressure acting on the outer end of the second piston to permit movement thereof by the fluid pressure acting on the electrode piston and thereby increase the length of stroke of the electrode piston.

2. A welder comprising a cylinder, a piston slidably mounted in the cylinder, an electrode connected to said piston, means for limiting the stroke of the electrode piston including a retracting piston slidably mounted in the cylinder in alignment with the electrode piston and engageable with the latter, a stop in the cylinder intermediate the ends thereof and forming a seat for the retracting piston, means for supplying fluid pressure to the cylinder between the pistons for moving the electrode piston in a direction to engage the electrode with the work to be welded, means for supplying fluid at substantially the same pressure as the fluid aforesaid to the cylinder at the outer end of the retracting piston, the area of the outer end of the retracting piston being greater than the area of the inner end of the latter piston whereby the retracting piston is maintained seated against said stop during operation of the electrode piston, and selectively operable means for relieving the pressure acting on the outer end of the retracting piston to permit movement of the latter by the pressure acting on said electrode piston to thereby increase the stroke of said electrode piston.

3. A welder comprising a cylinder, a piston slidably mounted in the cylinder, an electrode connected to the piston, means for limiting the stroke of the electrode piston including a second piston slidably supported in the cylinder beyond one end of the electrode piston, means for supplying fluid under pressure to the cylinder between the pistons and for also supplying fluid under practically the same pressure to the cylinder at the outer end of the second piston, the area of the second piston exposed to the fluid pressure introduced between the pistons being less than the area of the second piston exposed to the fluid pressure introduced to the cylinder at the outer end of the second piston, a stop for limiting the travel of the second piston in a direction toward the electrode piston, and selectively operable means for releasing the pressure applied to the cylinder at the outer end of the second piston to permit movement of the latter piston by said electrode piston.

4. A welder comprising a cylinder, a piston slidably mounted in the cylinder, an electrode connected to the piston, fluid pressure means for moving the piston in opposite directions in the cylinder to effect movement of the electrode into and out of engagement with the work to be welded, means for limiting the stroke of the electrode piston including a retracting piston also slidably mounted in the cylinder and engageable by the electrode piston, means for supplying fluid under pressure to the cylinder between the pistons and for also supplying fluid under substantially the same pressure to the cylinder at the outer end of the retracting piston, the area of the retracting piston exposed to the action of the fluid pressure introduced to the cylinder between the pistons being less than the area of the retracting piston exposed to the fluid pressure admitted to the cylinder at the outer side of the retracting piston, a stop for limiting movement of the retracting piston toward the electrode piston, and independently operable means for controlling the operation of the electrode piston and for selectively releasing the pressure acting on the outer end of the retracting piston to enable increasing the retracting stroke of the electrode piston.

5. A welder comprising a cylinder, a piston slidably mounted in the cylinder, an electrode connected to said piston, means for alternatively introducing fluid under pressure into the cylinder at opposite ends of the electrode piston to effect movement of the electrode into and out of engagement with the work to be welded, means for limiting the retracting stroke of the electrode piston including a second piston slidably mounted in the cylinder and engageable by the electrode piston on its retracting stroke, means for introducing to the cylinder at the outer end of the second piston fluid under a pressure substantially the same as the pressure of the fluid supplied to the cylinder at opposite sides of the electrode piston, the outer end of the second piston having an area exposed to the fluid under pressure greater than the area of the inner end of the second piston and also greater than the area of the outer end of the electrode piston whereby the second piston forms a stop for the electrode piston, and selectively operable means for relieving the pressure on the outer end of the second piston to enable movement of the latter by the electrode piston on its retracting stroke.

EDWARD O. COURTEMANCHE.

REFERENCES CITED

The following references are of record in the file of this patent:

UNITED STATES PATENTS

| Number | Name | Date |
| --- | --- | --- |
| 2,293,393 | Humphrey | Aug. 18, 1942 |
| 2,331,537 | Clark | Oct. 12, 1943 |